(12) United States Patent
Fritsch et al.

(10) Patent No.: US 7,449,809 B2
(45) Date of Patent: Nov. 11, 2008

(54) BRUSH HOLDER WITH CRIMP CONNECTION

(75) Inventors: Frank Fritsch, Kaufering (DE); Helmut Burger, Moorenweis (DE); Edmund Kuebler, Vienna (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 12/001,715

(22) Filed: Dec. 11, 2007

(65) Prior Publication Data

US 2008/0160817 A1    Jul. 3, 2008

(30) Foreign Application Priority Data

Dec. 12, 2006   (DE) ................. 10 2006 000 516

(51) Int. Cl.
    *H02K 11/02*    (2006.01)
(52) U.S. Cl. ...................... 310/249; 439/877
(58) Field of Classification Search ............. 310/249, 310/239; 439/877, 881, 882, 867
    See application file for complete search history.

(56) References Cited

U.S. PATENT DOCUMENTS

| 3,322,887 | A | * | 5/1967 | Polidori ............... 174/94 R |
| 4,050,757 | A | * | 9/1977 | Glaesel ................ 439/595 |
| 4,851,730 | A | * | 7/1989 | Fushiya et al. ........ 310/249 |
| 5,610,467 | A | * | 3/1997 | Shiah et al. .......... 310/239 |

* cited by examiner

*Primary Examiner*—Neil Abrams
(74) *Attorney, Agent, or Firm*—Abelman, Frayne & Schwab

(57) ABSTRACT

A brush holder (2) has a support element (4) to which a carbon cartridge (6) is attached, with a carbon brush (8) being held therein so as to be displaceable, and to which an electrical fixed contact (28) is attached which is electrically connected to the carbon brush (8) by a cord (10). A connection element (16) is provided between the cord (10) and the fixed contact (28). The connection element (16) has crimping means (18) at a first end which defines a crimping receptacle (20) in which the cord (10) is secured, and plug-in means (24) at a second end, which plug-in means (24) can be connected to complimentary plug-in means (26) of the fixed contact (28). The cord (10) projects into the crimping receptacle (20) through a first crimping receptacle end (22) adjacent to the plug-in means (24).

6 Claims, 2 Drawing Sheets

BRUSH HOLDER WITH CRIMP CONNECTION

BACKGROUND OF THE INVENTION

1. Field of the Invention

The present invention relates to a brush holder having a support element to which at least one carbon cartridge is attached, a carbon brush being held therein so as to be displaceable. Further, an electrical fixed contact that is electrically connected to the carbon brush by a cord is attached to the support element. A connection element is provided between the cord and the fixed contact and has crimping means at a first end which defines a crimping receptacle in which the cord is secured. At a second end, the connection element has plug-in means which can be connected to complimentary plug-in means of the fixed contact.

2. Description of the Prior Art

When assembling brush holders of the type mentioned above, the carbon brushes are mounted in the respective carbon cartridges with the cord already pressed on. The carbon brushes are then connected to the fixed contact by the connection element so that voltage can be applied to them during operation. The plug-in connection between the cord and the fixed contact allows for a particularly simple assembly.

U.S. Pat. No. 5,610,467 discloses a brush holder in which two carbon cartridges are fastened to a support plate. Each of the carbon brushes guided therein has a cord, and a connection element has a contact ring crimped onto the cord at its ends remote of the carbon brush. This contact ring can be secured to the support plate by a rivet, the support plate being inserted through the contact ring and into a receiving opening for this purpose. The rivet is then electrically connected to a connection cable.

It is disadvantageous in the known brush holder that the mechanical fastening to the support plate and the electrical connection to the connection cable are relatively complicated. In addition, the specially shaped parts of the plug-in connection result in relatively high production costs.

U.S. Pat. No. 4,050,757 shows an inexpensive electric plug-in connection. It has a connection element which is fastened to a cord at a first end by crimping means. At a second end, the connection element forms a plug-in receptacle into which a contact tongue can be inserted to produce an electrical contact.

A plug-in connection of the type mentioned above is particularly simple to produce, particularly when the contact tongue is easily accessible. However, to prevent the cord wire from breaking when used at a brush holder, it must be ensured over the lifetime of the carbon brush that the cord exiting from the connection element is curved only in a relatively large arc in direction of the carbon brush. In particular when the contact tongue projects from the brush holder in a relatively exposed manner, there must be a relatively large free installation space within which the cord can move as the carbon brush is used up without getting caught on other structural component parts in order to ensure good accessibility during production of the plug-in connection.

SUMMARY OF THE INVENTION

It is the object of the present invention to avoid the above-mentioned disadvantages in a brush holder and to provide an electrical connection between the fixed contact and the carbon brush that is easy to produce and requires little installation space.

According to the invention, this object is achieved with a brush holder in which the cord projects into the crimping receptacle through a first crimping receptacle end adjacent to the plug-in means. In this way, the cord exits from the crimping receptacle at the side facing the plug-in connection. Particularly when the plug-in connection is positioned relative to the support element so as to be relatively exposed. This allows the cord to be placed in such a way that it is held relatively close to the support element or to the carbon cartridge along its entire length and therefore requires only a small installation space for itself.

The crimping receptacle advantageously extends parallel to a plug-in axis defined by the plug-in means. This makes it possible to use commercially available connection elements so that production costs can be reduced.

Most preferably, the plug-in axis extends perpendicular to the support element so that the plug-in connection is particularly easy to access, which simplifies assembly.

In the connection element, advantageously, a distance between the crimping means and the plug-in means is at least 1.5-times of an outer diameter of the cord. In this way, the cord can be guided away from the connection element without the risk of kinking between the crimping means and the plug-in means.

Further, it is advantageous when the plug-in means and the complimentary plug-in means have, respectively, a slit-shaped plug-in receptacle and a contact tongue that is shaped so as to complement the plug-in receptacle, which makes it possible to produce a stable electrical contact.

In addition, the crimping means is advantageously formed at the first crimping receptacle end by jacket clamps for securely clamping a jacket of the cord and at a second crimping receptacle end of the crimping receptacle remote of the plug-in means by contact clamps for a frictionally engaging contact of a cord wire of the cord. This makes possible a particularly stable mechanical fastening of the connection element to the jacket of the cord by means of the jacket clamps, while the contact clamps ensure a particularly good electrical contact.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The invention will be described in more detail in the following with reference to an embodiment example.

The drawings show.

DETAILED DESCRIPTION OF THE PREFERRED EMBODIMENT

Figure 1:
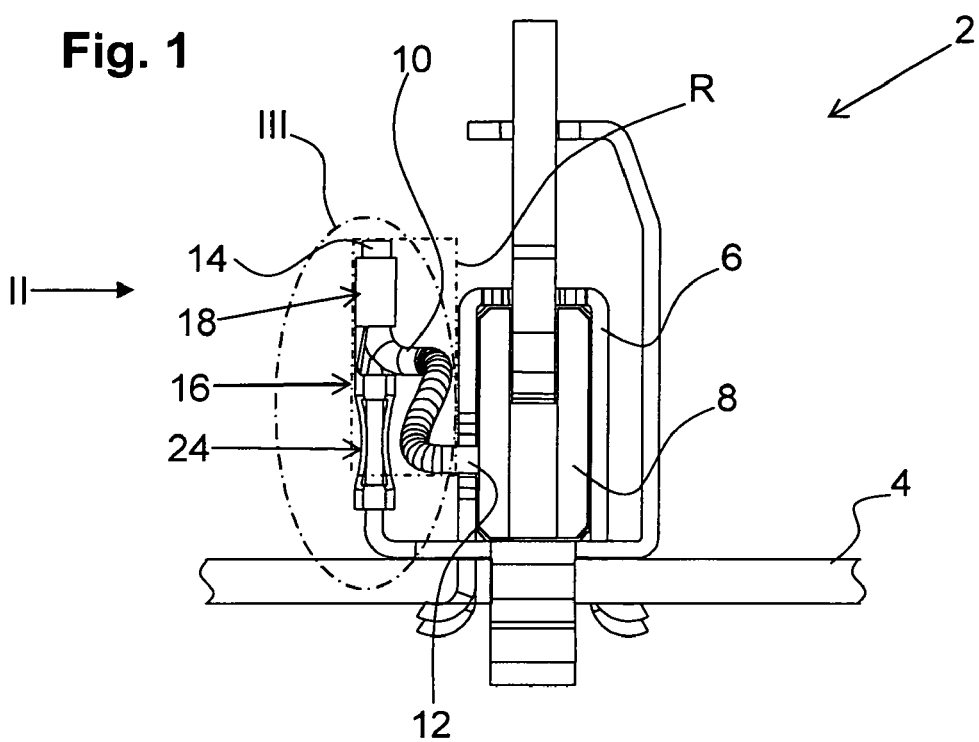
FIG. 1 a view of a section of a brush holder according to the invention.
Figure 2:
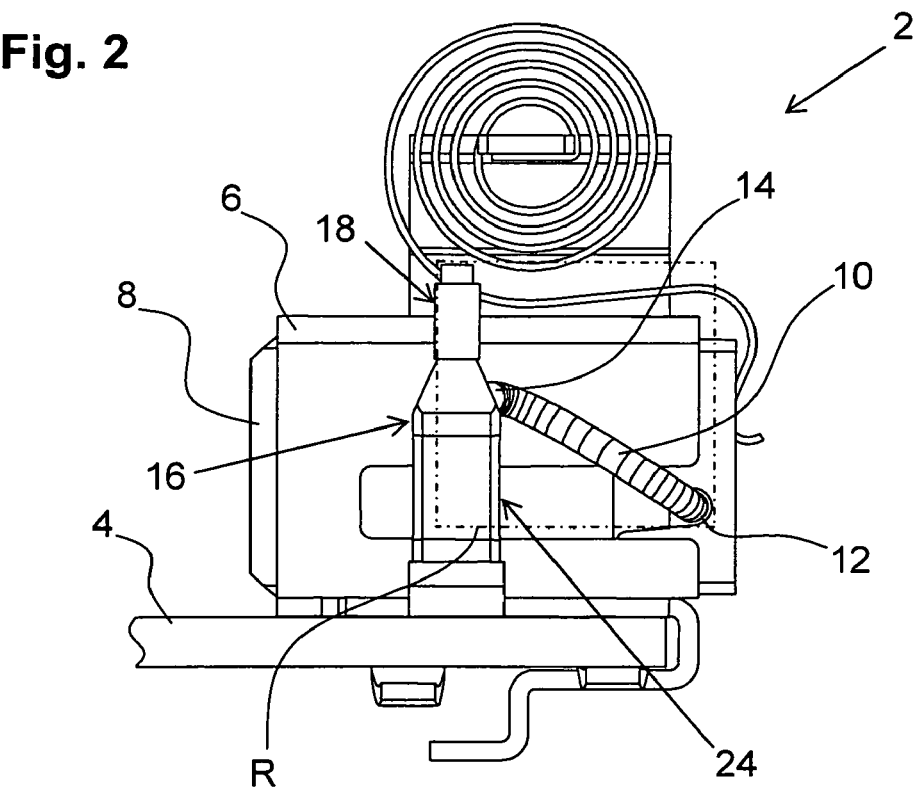
FIG. 2 a side view of the section of the brush holder according to FIG. 1.

FIGS. 1 and 2 show a brush holder 2 with a substantially ring-shaped support element 4 at which at least one carbon cartridge 6 is held. A carbon brush 8 is guided in the carbon cartridge 6, a cord 10 being pressed into this carbon brush 8 with a carbon-side cord end 12.

The cord 10 is connected to a connection element 16 in the form of a plug at a support-side cord end 14 remote of the carbon-side cord end 12. For this purpose, the connection element 16 has plastically deformable crimping means 18 which define a substantially cylindrical crimping receptacle 20 as is shown by dashed lines in FIG. 3.

Figure 3:
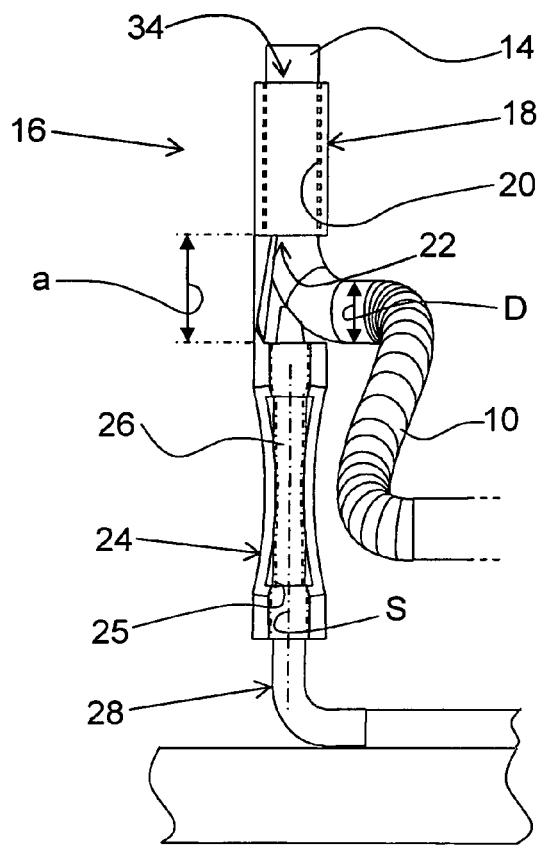
FIG. 3 an enlarged view of a connection element of the brush holder according to detail III from FIG. 1.

The support-side cord end 14 was first inserted into the crimping receptacle 20 through a first crimping receptacle end 22 to produce the connection between the cord 10 and the connection element 16. Plug-in means 24 which is likewise provided at the connection element 16 and forms, for example, a plug-in receptacle 25 faces toward this first crimping receptacle end 22 as is shown in FIG. 3 by dash-dot lines. These plug-in means 24 serves to connect the connection element 16 to complimentary plug-in means 26 in the form of a contact tongue of an electrical fixed contact 28 which is fixedly secured to the support element 4 and projects from the latter substantially perpendicularly. The plug-in means 24 and the complimentary plug-in means 26 define a plug-in axis S which extends in the projection direction and parallel to the main extension direction of the crimping receptacle 20 in the present example. Alternatively, the crimping receptacle 20 could also extend at an angle to the plug-in axis S.

After the cord 10 has been inserted into the crimping receptacle 20, the crimping means 18 were deformed by crimping pincers, not shown, in such a way that the crimping receptacle 20 is made smaller so that the connection element 16 is permanently clamped to the cord 10 in this way.

The cord 10 is formed of a bare conductor in FIGS. 1 to 3 so that the crimping means 18 have a constant shape from the first crimping receptacle end 22 to a second crimping receptacle end 34 remote of the plug-in means 24. In an alternative embodiment form according to FIG. 4 with a jacketed cord 10, the crimping means 18 can have jacket clamps 30 at the first crimping receptacle end 22 which serve to apply holding forces to a jacket 32 of the cord 10. At the second crimping receptacle end 34, however, the crimping means 18 have separate contact clamps 36 which serve to produce electrical contact with a cord wire 38 of the cord 10.

Figure 4:
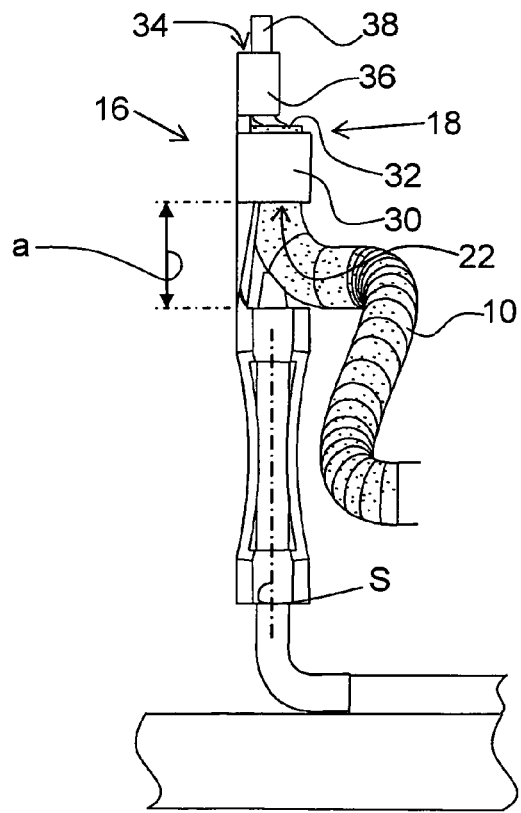
FIG. 4 a view similar to that of FIG. 3 of an alternative embodiment of the connection element.

In the attached state, the cord 10 is guided out of the connection element 16 between the crimping means 18 and the plug-in means 24 and installed in direction of the carbon brush 8 as is shown particularly in FIGS. 3 and 4. For this purpose, the crimping means 18 and the plug-in means 24 are held at the connection element 16 at a distance from one another of at least 1.5-times of an outer diameter D of the cord. In this way, the cord 10 can be guided out of the connection element 16 in an arc that is sufficiently large to rule out breakage of the cord 10 or of the cord wire 38.

As can further be seen from FIGS. 1 and 2, the exiting of the cord 10 from the connection element between the crimping means 18 and the plug-in means 24 allows the cord 10 to be arranged in a very small free installation space R that can be reserved between the fixed contact 28, the support element 4 and the carbon cartridge 6.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A brush holder (2), comprising a support element (4); a carbon cartridge (6) for displaceably receiving a carbon brush (8) and attached to the support element (4); an electrical fixed contact (28) secured on the support element (4); a cord (10) for connecting the electrical contact (28) with the carbon brush (8); and a connection element (16) provided between the cord (10) and the electrical fixed contact (28) and having, at a first end thereof, crimping means (18) defining a crimping receptacle (20) and, at a second end thereof, plug-in means (24) connectable with complementary plug-in means (26) of the electrical fixed contact (28), the cord (10) projecting into the crimping receptacle (20) through a first crimping receptacle end (22) adjacent to the plug-in means (24).

2. A brush support according to claim 1, wherein the crimping receptacle (20) extends parallel to a plug-in axis (S) defined by the plug-in means (24).

3. A brush support according to claim 2, wherein the plug-in axis (S) extends perpendicular to the support element (4).

4. A brush support according to claim 1, wherein the crimping means (18) is spaced from the plug-in means (24) by a distance (a) that is at least 1.5-times greater than an outer diameter (D) of the cord (10).

5. A brush support according to claim 1, wherein the plug-in means (24) and the complimentary plug-in means (26) have, respectively, a slit-shaped plug-in receptacle (25) and a contact tongue shaped so as to complement the plug-in receptacle (25).

6. A brush support according to claim 1, wherein the crimping means (18) is formed at the first crimping receptacle end (22) by jacket clamps (30) for securely clamping a jacket (32) of the cord (10), and at a second crimping receptacle end (34) of the crimping receptacle (20) remote from the plug-in means (24) by contact clamps (36) for frictionally engaging of a cord wire (38) of the cord (10).

* * * * *